United States Patent [19]

Parsy et al.

[11] Patent Number: 5,268,426
[45] Date of Patent: Dec. 7, 1993

[54] AGENT FOR RENDERING COMPATIBLE AT LEAST TWO INCOMPATIBLE THERMOPLASTIC POLYMERS, PROCESS FOR THE PREPARATION AND THERMOPLASTIC ALLOYS OBTAINED THEREFROM

[75] Inventors: Roland Parsy, Beaumont Le Roger; Nadine Rivas, St Ouen du Tilleul, both of France

[73] Assignee: Atochem, Puteaux, France

[21] Appl. No.: 687,966

[22] Filed: Apr. 19, 1991

Related U.S. Application Data

[62] Division of Ser. No. 201,778, Jun. 2, 1988, Pat. No. 5,055,521.

[30] Foreign Application Priority Data

Jun. 4, 1987 [FR] France ............................... 87 07800

[51] Int. Cl.$^5$ ............................................. C08L 53/00
[52] U.S. Cl. .............................................. 525/89; 525/90; 525/91; 525/92; 525/179; 525/182

[58] Field of Search ................... 525/91, 92, 179, 182, 525/89, 90

[56] References Cited

U.S. PATENT DOCUMENTS

3,626,025  12/1971  Anspon et al. ...................... 525/182

*Primary Examiner*—Ana L. Carrillo
*Attorney, Agent, or Firm*—Burgess, Ryan & Wayne

[57] ABSTRACT

An agent is provided which renders compatible at least two incompatible thermoplastic polymers. The agent contains one di- or trisequenced copolymer comprising at least one N-vinyl pyrrolidone or methyl (meth) acrylate telomer and one mono- or difunctional oligomer selected from the group consisting of an ethylenically unsaturated polymerizable monomer, or a polycondensable monomer, or a lactam. The agent is prepared by condensation of the telomer with the oligomer and is used in the preparation of alloys of incompatible thermoplastic polymers.

19 Claims, No Drawings

AGENT FOR RENDERING COMPATIBLE AT LEAST TWO INCOMPATIBLE THERMOPLASTIC POLYMERS, PROCESS FOR THE PREPARATION AND THERMOPLASTIC ALLOYS OBTAINED THEREFROM

This is a division, of application Ser. No. 201,778, filed Jun. 2, 1988 now U.S. Pat. No. 5,055,527.

FIELD OF THE INVENTION

This invention concerns an agent which renders compatible at least two incompatible thermoplastic polymers. The compbatibility agent is a di- or trisequenced copolymer comprised of at least one N-vinyl pyrrolidone or methyl (meth) acrylate telomer and by one mono-or difunctional oligomer of an ethylenically unsaturated polymerizable monomer, or a polycondensable monomer, or a lactam.

The invention likewise concerns the process for preparation of the compatibility agent. It is obtained by condensation, preferably in molten state, of N-vinylpyrrolidone, or methyl acrylate, or methyl methacrylate monofunctional telomer with one mono- or difunctional oligomer of ethylenically unsaturated monomer, eventually hydrogenated, or of polycondensable monomer, or a lactam.

The invention also concerns the application consisting in associating the compatibility agent with at least two incompatible thermoplastic polymers, but at least one of them is compatible with the telomer and at least one is compatible with the oligomer.

Finally the invention concerns the different alloys of thermoplastic polymers made compatible when mixed by association with the compatibility agent.

BACKGROUND OF THE INVENTION

In certain types of specific mixtures, it is known to make compatible two incompatible polymers by associating them with a third polymer, eventually sequenced or grafted, which is partially compatible with one and the other of the polymers. That is, for example, the case of the polyethylene-polystyrene mixture made compatible by a hydrogenated styrene-butadiene sequenced polymer.

The disadvantages of this method is that it does not disclose products that allow making systematically compatible two incompatible polymers. For example, it is now always known to make compatible couples, such as, polyamides-polyfluorinated, polyethylene-polyfluorinated, polyether block amide-poly(vinylchloride), styrenic resins-polyfluorinated. For associating such couples, it could be devised to incorporate into them as a mixture a third polymer in a quantity such that it could not be possible to speak of a compatibility agent but of a real three-compound mixture.

For those skilled in the art the compatibility agent serves only to modify the interfacial properties in two phases constituted by the two polymers to be made compatible without in itself constituting a third phase. It is for this reason that the effective compatibility agents are used only in small doses in the mixture of polymers to be made compatible, generally in a quantity below about 5% by weight of the mixture.

SUMMARY OF THE INVENTION

The compatibility agent according to the invention is characterized by the general formula:

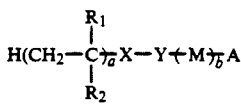

wherein
$R_1$ is hydrogen or a methyl group,
$R_2$ is the group

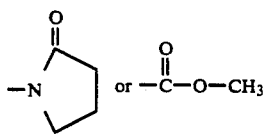

M is a monomeric unit derived from an ethyleneically unsaturated monomer, or from a polycondensable monomer, or from a lactam a and b are identical or different numbers between about 2 and 1000 and preferably between about 10 and 50 and A which is

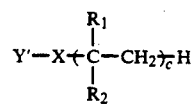

c being a number between about 2 and 1000 and preferably between about 10 and 50 and in this case:
  only Y or Y' exists and represents the functional residue of a difunctional chain limitator if M is derived from a polycondensable monomer or a lactam, or Y and Y' represent the functional residue of a difunctional polymerization agent if M is derived from an ethylenically unsaturated monomer and
  —X— is selected from the groups:

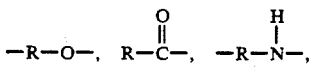

it being understood that the groups X and Y, or X and Y', or X and $(M)_b$ are interconnected by an ester or amino function, R being the residue of a monofunctional transfer agent.

(2) or the non-functional residue of a monofunctional polymerization agent if M is derived from an ethylenically unsaturated monomer and in this case:
  Y is the residue of the functional portion of the monofunctional agent, the function of which is selected from:

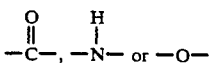

—X— is selected from the groups:

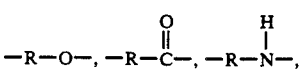

it being understood that the groups X and Y are interconnected by an ester or amide function, R being the residue of a monofunctional transfer agent.

(3) or in the case where M is derived from a polycondensable monomer or from a lactam, the residue of a monofunctional chain limiter whose proton is excluded if the active function is an amine or an alcohol, or whose hydroxyl group is excluded if the active function is a carboxylic acid and in this case:

Y is equal to zero

—X— is selected from —R—O—,

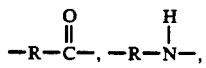

it being understood that the groups X and $(M)_b$ are interconnected by an ester or an amide function, R being the residue of a monofunctional transfer agent.

DETAILED DESCRIPTION OF THE INVENTION

As can be understood in the above general formula, the compatibility agent is a di- or trisequenced copolymer. These di- or trisequenced copolymers are obtained by condensation of a monofunctional telomer with a mono- or difunctional oligomer. This condensation is effected by forming an ester or amide bond between the telomer and the oligomer.

The monofunctional telomer that takes part in the preparation of the compatibility agent corresponds to the general formula:

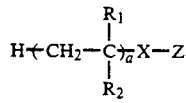

wherein $R_1$, $R_2$, a and X are as defined above, with Z=hydrogen if —X— is —R—O or $$-R-\overset{H}{\underset{|}{N}}-,$$

or Z=OH if —X— is

This telomer is obtained by polymerization of N-vinyl pyrrolidone or methyl (meth)acrylate in the presence of a monofunctional transfer agent. This polymerization, effected in a manner known per se, consists in thermally preparing by a non-functional polymerization agent in the sense of polycondensation, in a non-reactive solvent medium, under agitation and inert atmosphere, the growth of polymer chains which become deactivated to the monofunctional transfer agent. The reaction temperature can change from about 60 to 110° C. depending on the kinetics of decomposition of the polymerization agent.

This polymerization that leads to the preparation of the telomer can likewise be started by UV radiation insofar as the polymerization agent is replaced with a non-functional photostarter in the sense of polycondensation.

The polymerization agent is usually selected from the compounds azo, peroxidic, or mixtures thereof. The most usual are azobisisobutyronitrile and terbutyl peroxide.

The monofunctional transfer agent is preferably selected from the monofunctional mercaptans and more particularly, from mercaptoethanol, mercaptopropionic acid and thioglycolic acid.

The degree of polymerization of the telomer is controlled by the initial molar ratio of the monomer to the monofunctional transfer agent. This degree of polymerization is regulated by the know law $$\text{Ln}\left(1 - \frac{\alpha M_0}{T_0(\overline{DP}n)}\right) = C_T \times \text{Ln}(1 - \alpha)$$

α: rate of conversion of the monomer; the evolution of this rate can be measured by gas phase chromatography.

$M_0$ and $T_0$ are respectively the initial concentrations of monomer and of monofunctional transfer agent $\overline{DP}n$ represents the average degree of polymerization of the telomer $C_T$ is the constant of transfer to the monofunctional transfer agent. Numerous values of constant of transfer are grouped in "Polymer Handbook Second Edition p. III-92 Ed. J. BRANDRUP: E. H. IMMERGUT". The value of said constant can be experimentally determined by applying the above equation. It has thus been defined that the value of the transfer constant of the N-vinyl pyrrolidone to the mercaptopropionic acid: said constant is approximate to 1. Knowing the value of $C_T$ the operator can settle down initial concentrations $M_0$, $T_0$ and arrest the telomerization to a conversion rate α given so as to obtain the desired telomers of $\overline{DP}n$.

The monofunctional oligomer that can take part in the preparation of the compatibility agent corresponds to the general formula:

$$T-Y-(M)_b-A$$

wherein:

b is as defined above with:

(4) if M is a unit derived from an ethylenically unsaturated monomer:

A and Y are as defined above in (2)

T=H if Y carries the function:

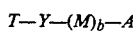

or

T=OH if Y carries the function

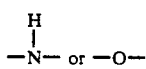

(5) if M is a unit derived from a polycondensable monomer or from a lactam:

A and Y are as defined above in (3)

T=H if the active function of A is an amine or an alcohol or

T=OH if the active function of A is a carboxylic acid.

The difunctional oligomer that can take part in the preparation of the compatibility agent corresponds to the general formula:

$$T-Y(M)_b-Y'-T'$$

wherein b is as defined above

Y and Y' are as defined above in (1) with:

(6) if M is a unit derived from a polycondensable monomer or from a lactam and (6.i) if the chain limitator is a diacid:

T=H or OH and respectively T'=OH or H (6.ii) if the chain limitator is a diol, or a diamine, or an aminoalcohol:

$$T=T'=H$$

(7) is M is a unit derived from an ethylenically unsaturated monomer:

T=T'=OH if the difunctional polymerization agent is a diacid or T=T'=H if the difunctional polymerization agent is a diamine or a diol.

The ethylenically unsaturated polymerizable monomers from which can be derived the patterns M correspond to the general formula:

$$CH_2=\overset{R_3}{\underset{R_4}{C}}$$

wherein $R_3$ is hydrogen or the methyl group $R_4$ is:
either an aromatic ring of 6 carbon atoms eventually replaced with one or more functions —CH₃, —Cl, —CH₂Cl, the preferred monomer being styrene.
or an aliphatic hydrocarbon groups having from 1 to 10 carbon atoms, linear or branched, which can include one or more unsaturations, the preferred monomer being butadiene.

Besides, the ethylenically unsaturated polymerizable monomers must habitually have a mode of termination in free radical polymerization that favors the recombination reactions in comparison with the dismutation reactions.

The polycondensable monomers from which can issue the patterns M correspond to the general formula:

$$B-R_5-C$$

wherein $R_5$ is either (i) an alkyl chain, linear or branched, containing from 4 to 12 carbon atoms or (ii) an aromatic nucleus preferably having 6 carbon atoms, which can be replaced with one or more functions —CH₃, —Cl or —CH₂Cl, or also a combination of two patterns described in (i) and/or (ii), said two patterns being joined by an ester or amide function.

B is NH₂, OH, COOQ with Q=H, Cl, or an alkyl chain, linear or branched, containing from 1 to 4 carbon atoms C is NH₂, OH, COOQ with Q such as defined in B.

The most common monomers are amino-11-undecanoic acid, dodecanedioic acid, butanediol, terephthalic acid, hexamethylene diamine, adipic acid, ethanolamine. Some of said monomers are homopolymerizable such as: amino11 undecanoic acid. Others must be associated for ensuring the polycondensation, which is the case, for example, of butanediol, terephthalic acid, adipic acid, hexamethylene diamine. In these conditions, it must be understood in this invention that when it is said that M is derived from polycondensable monomer, M is a monomeric pattern issued either from a monomer polycondensable on itself, or from at least two monomers not individually polycondensable on themselves but polycondensable one in respect to the other. By way of example: in the case of the polycondensation of a carboxylic diacid on a diamine, the monomeric pattern M comprises the rest of the molecule of diacid and of the molecule of diamine after condensation one on the other. In these cases, M' being derived from a non-homopolymerizable bifunctional monomer and M'' being derived from another non-homopolymerizable bifunctional monomer but polycondensable with the preceding one.

The lactams from which the patterns M can be derived are preferably caprolactam also called lactam 6 and dodecalactam also called lactam 12.

The monofunctional chain limitators serve to limit the growth of polymer chains during the polymerization of polycondensable monomers or of lactams so as to obtain a monofunctional oligomer. They are generally introduced with the starting monomers prior to starting the polycondensation. The quantities of limitator introduced are such that the molar ratio of the polycondensable monomers or of the lactams to the limitator are between about 2 and 150 and preferably, between about 10 and 50. The monofunctional chain limitators used in the polymerization of polycondensable monomers or of lactams habitually correspond to the general formula:

$$R_6-B$$

wherein

B is as defined above $R_6$ is either a hydrocarbonated chain, linear or branched, containing from about 2 to 20 carbon atoms or an aromatic nucleus.

Among these monofunctional limitators there are preferably selected lauric acid, lauryl amine, stearic acid, or oleic alcohol.

The difunctional chain limitators serve to limit the growth of polymer chains during the polymerization of polycondensable monomers or of lactams so as to obtain a difunctional oligomer. They are generally added to the starting monomers prior to the polycondensation. The difunctional chain limitators used in the polymerization of polycondensable monomers or of lactams are compounds which contain two functions that play the same part in the formation of an ester or amide group. Their introduction in the reaction medium creates a surstoichiometry of one type of function in relation to another type of reactive function. The quantities of limitator introduced are such that the molar ratio of the polycondensable monomers or of the lactams to the limitator are between about 2 and 150 and preferably, between about 10 and 50. The two functions of the chain limitator can be: carboxylic acids as in the case, for example, of the adipic or terephthalic acid; amines as in the case, for example, of the hexamethylenediamine;

alcohol and amine in the case, for example, of the ethanolamine.

The monofunctional polymerization agents serve to obtain, by free radical polymerization, preferably monofunctional oligomers of ethylenically unsaturated monomers whose mode of termination favors the recombination. They are introduced mixed with the starting monomers in a solvent of the final oligomer. The quantities introduced are such that the molar ratio of the ethylenically unsaturated monomers to the monofunctional polymerization agent are between about 2 and $10^{+3}$ and preferably, between about 10 and 50. They are habitually selected among the compounds of the general formula:

$$R_8—E—R_7—D$$

wherein

E is a function capable of homolytically decomposing under the action of heat for starting the formation of two radicals. Said function is habitually: azo, peroxide or percarbonate, D is a proton or also $NH_2$, OH, COOQ with Q=H, Cl, or a linear or branched alkyl chain containing from 1 to 4 carbon atoms.

$R_7$ is either a linear or branched hydrocarbon chain including from 1 to 7 carbon atoms and capable of containing at least one nitrogen and/or oxygen atom or equal to zero. It is understod that after homolytic decomposition of the monofunctional agent, the radical which includes the fragment ($R_7$—D) is functional in the sense of polycondensation, $R_8$ is a linear or branched hydrocarbonated chain including 1 to 7 carbon atoms and capable of containing at least one nitrogen and/or oxygen atom.

Terbutylic hydroperoxide or 4(-terbutylazo-)4-cyanovaleric acid are preferably selected among these monofunctional agents orinitiators of polymerization.

The difunctional polymerization agents serve to obtain, by free radical polymerization, preferably difunctional oligomers of ethylenically unsaturated monomers whose mode of termination favors the recombination. They are introduced mixed with the starting monomers in a solvent of the final oligomer. The quantities introduced are such that the molar ratio of the monomers to the difunctional polymerization agent are between about 2 and $10^3$, preferably between about 10 and 50. These are symmetric compounds of the general formula:

$$D—R_7—E—R_7—D$$

wherein

E, $R_7$ and D are as defined above.

Hydrogen peroxide, azobiscyanovaleric acid, or also azobiscyanopentanol are preferably selected among these difunctional agents or initiators of polymerization.

The monofunctional transfer agent serves to obtain, by free radical polymerization, monofunctional telomers of N-vinyl pyrrolidone or of methyl (meth) acrylate. It is introduced mixed with the N-vinyl pyrrolidone or the methyl (meth) acrylate, prior to polymerization, in a quantity such that the molar ratio of the monomer to the monofunctional transfer agent is between about 2 and $10^3$, and preferably, between about 10 and 50. It is habitually selected among the compounds of the general formula:

$$X—R_9—B$$

wherein:

X is a halogen or a thiol function SH

B is as defined above $R_9$ is a linear or branched hydrocarbonated chain including from 1 to 8 carbon atoms and capable of containing at least one nitrogen and/or oxygen atom.

Mercaptopropionic acid, mercaptoethanol, thioglycolic acid, or also iodoacetic acid are preferably selected among these monofunctional transfer agents.

The monofunctional oligomer that can take part in the preparation of the copatibility agent can be produced by any known process. However, according as there is used for its preparation, on the one hand, an ethylenically unsaturated monomer and, on the other hand, a polycondensable monomer or a lactam, it is preferred to prepare it under the following conditions.

(8) In the case where an ethylenically unsaturated monomer is used, the oligomer is obtained by polymerization of a monomer such as defined above in the presence of a monofunctional polymerization agent. This polymerization, known per se, consists in thermally starting, in a non-reactive solvent medium under stirring and inert atmosphere, by a monofunctional polymerization agent, the growth of polymeric chains which become deactivated by termination reaction. The reaction temperature, which depends on the decomposition kinetics of the monofunctional polymerization agent, can change from 60° to 130° C. The average degree of polymerization ($\overline{DPn}$) follows the MAYO law:

$$\frac{1}{\overline{DPn}} = \left( \frac{2 \times F \times k_d \times k_t}{k_p} \right)^{\frac{1}{2}} \times \frac{[I]^{\frac{1}{2}}}{[M]}$$

$k_d$ is the decomposition constant of the monofunctional polymerization agent $k_t$ is the termination constant $k_p$ is the polymerization constant f represents the starting effectiveness

[I] is the concentration of monofunctional polymerization agent

[M] is the concentration of monomer.

The values of the different constants are indexed in "Polymer Handbook—Second Edition p. II-92 Ed. BRANDRUP, E. H. IMMERGUT".

(9) In the case where a polycondensable monomer or a lactam is used, the oligomer is obtained by polycondensation of a monomer as defined above or of a lactam in the presence of a monofunctional polymerization limitator. This polycondensation is carried out in a known manner under stirring at temperatures usually between about 200° and about 300° C. under vacuum or under inert atmosphere. In the case of a polycondensation with formation of bonding ester, the kinetics of reaction can be improved by adding to the reaction medium an esterification catalyst. The chain length of the oligomer can be determined by the initial molar ratio between the polycondensable monomer or the lactam and the monofunctional polymerization limitator, knowing that there is one molecule of limitator per chain of oligomer.

The difunctional oligomer that can take part in the preparation of the compatibility agent can be prepared by any known process. However, according as there is used for its preparation, on the one hand, an ethylenically unsaturated monomer and, on the other hand, a polycondensable monomer or a lactam, it is preferred to prepare it according to the conditions that follow.

(10) In the case where an ethylenically unsaturated monomer is used, the oligomer is obtained according to the method described above under (8) by respectively replacing the monofunctional polymerization or transfer agent with difunctional polymerization or transfer agents.

If the above hydrocarbon group $R_4$ contains an unsaturation, it is possible to subject the above difunctional or monofunctional oligomer to a hydrogenation in order to make $R_4$ entirely saturated. This hydrogenation can be carried out in an autoclave, under hydrogen pressure, in the presence of a hydrogenation catalyst such as Raney nickel or cobalt naphthenate. The hydrogen pressure is usually from about 1 to 20 bars and the reaction temperature is between about 60° and 120° C.

(11) In the case where a polycondensable monomer or a lactam is used, the oligomer is obtained according to the method described above under (9) by replacing the monofunctional polymerization limitator with a difunctional polymerization limitator.

The di- or trisequenced copolymers of the invention are preferably obtained by condensation in a molten state of a monofunctional telomer such as defined above with a mono- or di-functional oligomer of an ethylenically unsaturated monomer, of a polycondensable monomer, or of a lactam.

This polycondensation binds, in a covalent manner, the telomer and the oligomer by ester or amide functions. It is carried out at a temperature at which the telomer and the oligomer are in a molten state or at the very least malleable. This temperature is generally between about 200° and about 300° C. The polycondensation is equally carried out preferably under vacuum or under sweeping of inert gas in order to eliminate the volatile products formed. The initial quantities of telomer and of oligomer are adjusted so as to have substantially stoichiometric quantities of functions that ensure the condensation. If the condensation leads to the formation of ester functions, the reaction kinetics can be accelerated by incorporation into the mixture of a small quantity of esterification catalyst. The quality of the sequencing is evaluated by dosing of the rate of residual functions in the bi- or trisequenced copolymers obtained that represent the compatibility agent.

The compatibility agent makes it possible to combine, homogeneously, at least two thermoplastic polymers that are incompatible, but of which one is compatible with the telomer that constitutes the compatibility agent and the other is compatible with the oligomer that constitutes this compatibility agent. The compatibility agent is incorporated in the usual manner into the mixture of thermoplastic resins in molten state in a kneading apparatus. The quantity of compatibility agent introduced is small, on the order of from about 0.1 to about 5% and preferably from about 0.5 to about 1% by weight in relation to the weight of the mixture of thermoplastic resins. This small quantity of agent in the mixture prevents to the maximum, the influence of a third copolymer on the physical and chemical properties of the mixture of thermoplastic resins that have become compatible.

The compatibility created by the agent according to the invention is evidenced by electronic microscopy and by the mechanical properties of the product resulting from the mixture of incompatible thermoplastic polymers.

When examined by electronic microscopy, the morphology of a mixture of thermoplastic polymers without the compatibility agent appears in the form of large nodules of a polymer included in the matrix constituted by the other polymer. The adhesion between the nodules and the matrix is non-existent. The addition of the compatibility agent produces a significant reduction of the size of the nodules which in certain cases cannot be observed. There is equally observed a strong adhesion between the visible phases by a covering of the nodules by the matrix. In these conditions is formed what can be called an alloy by assimilation to the metallurgic structures, being different from the mixtures.

The mechanical properties of such thermoplastic alloys are substantially approximate to, if not better than, those of the constituents balanced by the fraction by volume of each constituent, a consequence of the law of additivity.

The corresponding mixtures of incompatible thermoplastic resins without a compatibility agent possess, on the contrary, mechanical properties generally approximate to those of the least performing constituent.

By way of example, the compatible thermoplastic polymers with the telomers that take part in the composition of the compatibility agent can be: fluorinated polymers such a polyvinylidene fluoride and polyvinyl fluoride; chlorinated polymers such as polyvinyl chloride and polyvinylidene chloride.

By the name of polymers, there are equally understood the copolymers insofar as the content of compatible patterns of the copolymer is sufficient for preserving the compatibility.

The thermoplastic polymers compatible with the oligomers that take part in the composition of the compatibility agent evidently depend on the nature of the oligomer.

By way of example, there can be cited as compatible with the mono- and di-functional oligomers of amino-11 undecanoic acid: the polyamides, in particular 11 and 12, and the block copolymers derived from said polyamides such as, for example, the polyether block amides.

There can likewise be cited as compatible with the mono- and di-functional styrene oligomers: the styrenic resins such as polystyrene.

There can also be cited as compatible with the hydrogenated di-functional butadiene oligomers: the polyethylene and the ethylene-based copolymers such as the vinyl ethylene-acetate copolymer.

By virtue of the compatibility agent of the invention, it is possible to obtain new allys of thermoplastic resins such as, by way of examples: polyamide-polyfluorinated; polyethylene-polyfluorinated; polyether block amide-polyvinylchloride; styrenicresins-polyfluorinated; polyether block amide - polyfluorinated, or to improve on the best known systems such as styrenicresins-polyvinylchloride; polyethylene-polyvinylchloride resin; polyvinylchloride ethylene-vinylacetate copolymer.

The following alloys are particularly regarded as novel in themselves:
   polyamide-polyfluorinated and more particularly
      polyamide 11 or 12-polyvinylidene fluoride
   block amide-polyvinylidene fluoride styrenicresin-polyfluorinated and more particularly polystyrene-poly(vinylidene fluoride)
polyethylene-polyfluorinated and more particularly polyethylene-poly(vinylidene fluoride)
polyether block amide-polyvinylchloride.

The examples that follow illustrate the invention without limiting it.

EXAMPLE 1

A—Determination of the transfer constant $C_T$ of N-vinyl pyrrolidone

In a round-bottomed flask of 100 cm³ there are introduced 10 g of N-vinyl pyrrolidone, 0.74 g of beta-mercaptopropionic acid, 0.4 g of azobisisobutyronitrile, 47.4 g of ethanol. This mixture is heated to 60° C. under stirring and nitrogen sweeping.

The reaction is arrested at any time desired by immersing the flask in ice. One sample of the mixture is then injected in gas phase chromatography in order to determine the rate of residual monomer by internal gauging with orthodichloribenzene. The rest of the mixture is precipitated cold in ethylic ether, filtered and dried: the telomer thus obtained is analyzed by osmometry and by dosing the acid functions.

The table that follow gives the characteristics of the telomers: $Mn_{COOH}$ and $DPn_{COOH}$ are the medium molecular weight and the medium degree of polymerization of the telomer determined by the measurement of the terminal carboxylic functions: $Mn_{OSMO}$ and $DPn_{OSMO}$ are the same sizes estimated by osmometry (osmometry with steam tension KNAUER).

| Reaction periods (minutes) | Conversion rate | $\overline{Mn}_{COOH}$ | $\overline{DPn}_{COOH}$ | $\overline{Mn}_{OSMO}$ | $\overline{DPn}_{OSMO}$ |
|---|---|---|---|---|---|
| 15 | 0.28 | 1178 | 9.66 | 1119 | 9.13 |
| 38 | 0.38 | 1276 | 10.54 | 1248 | 10.29 |
| 60 | 0.43 | 1387 | 11.54 | 1286 | 10.63 |
| 120 | 0.64 | 1486 | 12.44 | 1420 | 11.84 |

These data make possible the calculation of the transfer constant $C_T$ by the tracing of the function $$\mathrm{Log}\left(1 - \frac{\alpha M_o}{T_o \times (\overline{DPn})}\right) = f\mathrm{Log}(1-)$$

The value of this constant is 0.91 if $(\overline{DPn})$ is evaluated by the dosing of the terminal functions and 1.01 if $(\overline{DPn})$ is determined by osmetry: the system (N-vinyl pyrrolidine-beta-mercaptopropionic acid) approximates the ideal ($C_T = 1$), which simplifies the anticipated calculations.

B—Preparation of the N-vinyl Pyrrolidone Telomer

In a flask of 2,000 cm³ there are introduced 230 g of N-vinyl pyrrolidone, 11.7 g of beta-mercaptopropionic acid, 9.2 g of azobisisobutyronitrile, 600 cm³ of ethanol. This mixture is heated to 60° C. for 6 hours under stirring and nitrogen sweeping. The monocarboxylic telomer is precipitated cold by ethylic ether, filtered and dried. There are recovered 220.8 g of a average molecular weight of 2177 determined by dosing of the terminal carboxylic functions.

C—Preparation of the α,ξ-Diamine Oligomer of Amino-11 Undecanoic Acid

In a 500 cm³ autoclave there are introduced 200 g of amino-11 undecanoic acid and 10.2 g of hexamethylene diamine. The reactor is heated in a closed position for 2 hours at 240° C. after having cleansed it with nitrogen. The heating is continued for two hours while establishing in the reactor a progressive vacuum of 130 Pa. There is thus obtained a diamine oligomer whose weight is 2000 determined by dosing of the terminal functions.

D—Preparation of the Tri-sequenced Copolymer

In a Dumas 1-liter reactor there are introduced 210 g of monocarboxylic telomer of N-vinyl pyrrolidone of $\overline{Mn}_{COOH}$ equal to 2177 and synthesized as described above and 96.5 g of α,ωdiamine oligomer of amino-11 undecanoic acid of weight 2000 described above. The combination is brought to 240° C. under stirring and a vacuum of about 130 Pa, for 3 hours. After cooling, there is obtained a tri-sequenced copolymer poly N-vinyl pyrrolidone-polyamide 11-poly N-vinyl pyrrolidone whose inherent viscosity in metacresol is of 0.66 and whose acid and amine indices are respectively 0.031 meq/g and 0.037 meq/g.

EXAMPLE 2

A—Preparation of the Telomers

In the table that follows are comprised the synthesis conditions of five different telomers whose number average molecular weights have been determined by dosing of the terminal functions ($\overline{Mn}_{COOH}$).

For each synthesis there are introduced in a flask of the indicated size the indicated quantities of N-vinyl pyrrolidone, of mercaptopropionic acid, of ethanol and of azobisisobutyronitrile. The mixture is heated to 60° C. for 6 hours under stirring and nitrogen sweeping; it is precipitated cold in ethylic ether. The precipitate is filtered, dried and then weighed.

| Number of the telomer | Capacity of the flask (cm³) | Ethanol (cm³) | N-vinyl pyrrolidine (g) | Mercapto propionic acid (g) | Azobis isobutyronitrile (g) | Weight of precipitate (g) | $\overline{Mn}_{COOH}$ |
|---|---|---|---|---|---|---|---|
| T-1 | 250 | 150 | 25 | 1.85 | 1 | 14 | 2240 |
| T-2 | 1000 | 600 | 97.3 | 2.7 | 3.9 | 81.7 | 4551 |
| T-3 | 250 | 150 | 25 | 1.85 | 1 | 23.5 | 1752 |
| T-4 | 1000 | 600 | 230 | 17.0 | 9.2 | 220 | 1875 |
| T-5 | 1000 | 600 | 230 | 17.0 | 9.2 | 240 | 1840 |

B—Preparation of the Oligomers

B.1 Preparation of Monoamino Oligomers of Amino-11 Undecanoic Acid

In the table that follows have been grouped the conditions of synthesis of two monofunctional oligomers whose number average molecular weights have been determined by dosing the terminal amine functions ($\overline{Mn}_{NH2}$).

For each synthesis there are introduced in a 200 cm³ tube 20 g of amino-11 undecanoic acid and the indicated quantity of lauryl amine. The mixture is brought to 240° C. under nitrogen sweeping and stirring for 3 hours: therefore, the polycondensation is conducted in bulk

| Number of the oligomer | Lauryl amine (g) | $\overline{Mn}_{NH_2}$ |
|---|---|---|
| 0-1 | 1.3 | 2190 |
| 0-2 | 0.7 | 4328 |

B.2 Preparation of α,ωDiamine Oligomers of Amino-11 Undecanoic Acid

In the table that follows have been gathered the conditions of synthesis of three difunctional oligomers whose number average molecular weights have been determined by dosing the terminal functions.

For each synthesis there are introduced in a 200 cm³ tube 20 g of amino-11 undecanoic acid and the indicated quantity of hexamethylene diamine. The mixture is brought to 240° C. for 1 hour while keeping the tube in a closed position after having cleansed it with nitrogen, then for 2 hours under nitrogen sweeping.

| Number of the oligomer | Hexamethylene diamine (g) | $\overline{Mn}_{NH_2}$ |
|---|---|---|
| 0-3 | 1 | 2000 |
| 0-4 | 0.5 | 4066 |
| 0-5 | 1.15 | 1535 |

C—Preparation of the Copolymers

Bi-sequenced copolymers are prepared by condensing a monocarboxylic telomer selected among from T-1 to T-5 with a monoamino oligomer selected between 0-1 and 0-2.

Tri-sequenced copolymers are prepared by condensing a monocarboxylic telomer selected among from T-1 to T-5 with an α,ω-diamino oligomer selected among from 0-3 to 0-5.

This condensation is carried out in a 200 cm³ tube in which are introduced 10 grams of functional oligomer selected among from 0-1 to 0-5 and a quantity of telomer selected among from T-1 to T-5 so as to obtain a stoichiometry equal to 1 between the terminal amine and carboxylic functions. In the table that follows have been grouped the synthesis effected. The mixtures are brought to 240° C. for 3 hours under stirring and under a vacuum of about 130 Pa.

| Number of the sequenced copolymer | Nature of the sequenced copolymer | Number of the telomer | Number of the oligomer | Weight of condensed telomer with 10 g oligomer (g) |
|---|---|---|---|---|
| S-1 | Disequenced | T-1 | 0-1 | 10.2 |
| S-2 | Disequenced | T-2 | 0-2 | 10.5 |
| S-3 | Trisequenced | T-3 | 0-3 | 22.6 |
| S-4 | Trisequenced | T-4 | 0-4 | 18.4 |
| S-5 | Trisequenced | T-5 | 0-5 | 9.2 |

EXAMPLE 3

In a flask of 250 cm³ there are introduced 33.3 g of methyl methacrylate, 1.85 g of beta-mercaptopropionic acid, 1 g of azobisisobutyronitrile and 50 cm³ of ethanol.

The mixture is heated to 60° C. for 5 hours and 30 minutes.

The precipitation of the telomer in the ethanol is observed; this telomer is separated by filtration, washed with ether and dried. There are obtained 30 g of a telomer having a average molecular weight of 7059 determined by dosing the terminal carboxylic functions.

10 g of this telomer are condensed with 4.6 g of the α,ωdiamino oligomer of amino-11 undecanoic acid of weight 1535, the preparation of which has been described in Example 2-B.2 under number 0-5. The condensation is conducted in a 200 cm³ tube, while stirring under a vacuum of about 130 Pa, for 4 hours at 240° C. After condensation there is obtained a trisequenced copolymer poly(methylmethacrylate)-polyamide 11-poly(methylmethacrylate).

EXAMPLE 4

An oligomer of the styrene is prepared by recombination of macroradicals of the styrene primed by azobicyanovaleric acid. 50 g of styrene and 7.22 g of azobicyanovaleric acid are added to 300 cm³ of dioxane. The whole is brought to 98° C. for 6 hours under nitrogen sweeping. At the end of the reaction the solvent is distilled under vacuum. There is obtained an oligomer having a molecular weight equal to 1821 and a medium functionality of 2.4. A monohydroxylated telomer of N-vinyl pyrrolidone is obtained by heating for 6 hours at 60° C. under stirring and nitrogen sweeping in a 1000 cm³ flask a mixture comprising 130.8 g N-vinyl pyrrolidone, 3.85 g mercaptoethanol, 5.25 g azobisisobutyronitrile and 500 cm³ ethanol. This telomer is then precipitated cold in ethylic ether, filtered and dried; there are gathered 130.4 g of telomer having a medium molecular weight of 1665 determined by dosing the terminal hydroxyl functions. 20 G of this styrene oligomer and 36.6 g of this telomer of N-vinyl pyrrolidone are introduced in a 200 cm³ tube. This mixture is brought to 90° C. under stirring and nitrogen sweeping for 3 hours and then under vacuum of 130 Pa for 15 minutes. This reaction is catalyzed by 0.5 cm³ zirconium tetrabutylate.

There is obtained a trisequenced copolymer polyvinyl pyrrolidone-polystyrene-polyvinyl pyrrolidone whose inherent viscosity in metacresol is 0.24 and whose indices of acid and hydroxide are below 0.04 meq/g.

EXAMPLE 5

A hydroxytelechelic oligomer of butadiene is prepared by recombination of macroradicals of butadiene primed by hydrogen peroxide according to the process described in British Patent 957,788. 50 g of the oligomer thus obtained are hydrogenated, in solution, in 300 cm³ toluene in an autoclave of one liter. The hydrogenation is conducted at 100° C., under 12 bars of hydrogen, and is catalysed by 2 g (RuCl₂(PPh₃)₃).

After three hours of reaction, the hydrogenated oligomer is purified by precipitation in acetone.

The oligomer is 96% hydrogenated. Evaluated by osmometry, the molecular weight of the hydrogenated oligomer is 2338 and its average functionality is 2.1.

A monocarboxylic telomer of N-vinyl pyrrolidone is prepared by introducing in a 250 cm³ flask, 25 g N-vinyl pyrrolidine, 1.8 g beta-mercaptopropionic acid, 1 g azobisisobutyronitrile and 150 cm³ ethanol. The mixture is brought to 60° C. for 6 hours under stirring and nitrogen sweeping; it is then precipitated cold in ethylic ether, filtered and dried. There are obtained 23 g of a telomer having a average molecular weight equal to 1736 determined by dosing the terminal carboxylic functions. In a 100 cm$^3$ flask, there are introduced 10 g hydrogenated oligomer and 6.2 g telomer. The whole is brought to 200° C. for 5 hours under stirring and vacuum of 0.5 Torr in the presence of 0.16 cm$^3$ zirconium tetrabutylate. There is obtained a trisequenced copolymer whose acid and hydroxyl indices show an esterification yield of 91%.

EXAMPLE 6 a mixture by weight including 49.5 parts of polyamide-12 (grade AESNO of the firm ATOCHEM), 49.5 parts of poly(vinylidene fluoride) (FORAFLON 1000LD of the firm ATOCHEM) and one part of the trisequenced copolymer described in Example 1 is brought to 200° C. and kneaded in the interior of a BRABENDER plastograph for 15 minutes (SAMPLE 1). A control mixture is prepared under the same conditions without incorporating tri-sequenced copolymer (SAMPLE 2).

The examination by electronic microscopy of cryogenic fractures of said samples shown the compatibility induced by the presence of the tri-sequenced copolymer.

The size of the nodule of poly(vinylidene fluoride) dispersed in the matrix of polyamide-12 is of from 5 to 6 microns for sample 2 and from 0.6 to 0.9 microns for sample 1; in addition the density of population of these nodules is quite less for sample 1.

This compatibility is confirmed by the measurement of tensile strength which is 14% for sample 2 and 183% for sample 1.

Different mixtures containing 49.5 parts of polyamide 12, 49.5 parts of poly(vinylidene fluoride) and part of one of the sequenced copolymers described in Examples 2 and 3 are brought to 200° C. and kneaded in the interior of a BRABENDER plastograph for 15 minutes.

The examinations by electronic microscopy indicate the same evolution of the morphology of the mixtures as that observed between samples 1 and 2. The size of the nodules of poly(vinylidene fluoride) is smaller than that observed for the control mixture (SAMPLE 2). These nodules are less than 1.5 microns if the sequenced copolymer incorporated in the mixture is S-3, S-4 or S-5. They are less than 3 microns if the sequenced copolymer is S-1 or S-2, or the one described in Example 3.

EXAMPLE 7

A mixture by weight composed of 49.5 parts of poly(vinyl chloride) (grade RB 8010 of the firm ATOCHEM stabilized by IRGASTAB 17 MOK), 49.5 parts of a polyether block amide (PEBAX 3533 of the firm ATOCHEM) and 1 part of trisequenced copolymer described in Example 1-D is used in the conditions described in Example 6 (SAMPLE 3).

A control mixture is prepared under the same conditions without incorporating tri-sequenced copolymer (SAMPLE 4).

The examination by electronic microscopy shows that the compatibility induced by the trisequenced copolymer leads to a reduction of the size and of the density of population of the nodules of poly(vinyl chloride) in the matrix of polyether block amide. The size of the nodules is from 3 to 4 microns for sample 4 and less than 0.6 micron for sample 3.

EXAMPLE 8

A mixture by weight of 49 parts of polystyrene (Lacqrene 1160 crystal of the firm ATOCHEM), 49 parts of poly(vinylidene fluoride) (FORAFLON 1000 HD of the firm ATOCHEM) and 2 parts of the trisequenced copolymer described in Example 4 is used under the conditions described in Example 6 (SAMPLE 5).

A control mixture is prepared under the same conditions without incorporating trisequenced copolymer (SAMPLE 6).

The examination by electronic microscopy of sample 6 shows that the two polymers are highly incompatible nodules of from 20 to 100 microns of poly(vinylidene fluoride) are distinguished in the matrix of polystyrene; besides, at the time of the cryogenic fracture, numerous nodules have been evacuated and numerous cavities are observed, which is a sign of poor adhesion between the nodules and the matrix.

The examination of sample 5 indicates a very fine morphology: the nodules have a size of less than a micron and practically no cavities are shown, which gives evidence of a good interphasic adhesion.

The compatibility is confirmed by the resistance to solvent of the samples. Sample 5 and 6 are immersed in toluene at room temperature under vigourous stirring: after 4 hours of treatment, sample 6 has lost 10% of its weight while sample 5 has lost only 1.2% of its weight.

EXAMPLE 9

A mixture by weight of 49.5 parts of polyethylene (Lacqrene 2003 SN 53 of ATOCHEM), 49.5 parts of poly(vinylidene fluoride) (FORAFLON 6000 HD of ATOCHEM) and 1 part of the trisequenced copolymer described in Example 5 is kneaded in the interior of a BRABENDER plastograph for 20 minutes at 200° C. (SAMPLE 7).

A control mixture is prepared under the same conditions without incorporating trisequenced copolymer (SAMPLE 8).

The morphologies of samples 7 and 8 are continuous phases. After cryogenic fracture of the samples and extraction of the polyethylene phase with orthodichlorobenzene, the fineness of the dispersion of the vinylidene polyfluoride phase can be observed by measuring the section of the fracture zones. This section has a medium diameter of 18 microns for sample 8 and of 10 microns for sample 7.

EXAMPLE 10

A mixture by weight of 49.5 parts of polyether block amide (PEBAX 5533 of ATOCHEM), 49.5 parts of poly(vinylidene fluoride) (FORAFLON 6000 HD of ATOCHEM) and 1 part of tri-sequenced copolymer described in Example 1-D is kneaded in the interior of a BRABENDER plastograph for 15 minutes at 200° C. (SAMPLE 9).

A control mixture is prepared under the same conditions without incorporating tri-sequenced coplymer (SAMPLE 10).

The examination by electronic microscopy of the cryogenic fractures of these samples shows that the medium size of the poly(vinylidene fluoride) nodules dispersed in the matrix of polyether block amide is 8.6 microns for sample 10 and 5.1 microns for sample 9.

On the other hand, the covering of the nodules by the matrix is more considerable for sample 9 than for sample 10, which evidences the improvement of the adhesion between the phases.

What is claimed is:

1. An alloy of at least two incompatible thermoplastic polymers made compatible by addition to the alloy of at least one compatibilizing copolymer selected from the group consisting of di-sequenced block copolymers comprising the residue of at least one telomer selected from the group consisting of telomers comprising N-vinyl pyrrolidone residues, telomers comprising methyl acrylate residues and telomers comprising methyl methacrylate residues and the residue of a monofunctional oligomer containing residues of at least one monomer selected from the group consisting of ethylenically unsaturated monomers and polycondensable monomers and tri-sequenced block copolymers comprising the residue of at least one telomer selected from the group consisting of telomers comprising N-vinyl pyrrolidone residues and telomers comprising methyl methacrylate residues and a di-functional oligomer containing residues of at least one monomer selected from the group consisting of ethylenically unsaturated monomers and polycondensable monomers.

2. An alloy of claim 1 wherein the telomer comprises N-vinyl pyrrolidone residues terminated with a carbonyl or a hydroxyl group.

3. An alloy of claim 1 wherein the telomer comprises methyl acrylate and methyl methacrylate residues terminated with a hydroxyl or a carbonyl group.

4. An alloy of claim 1 wherein the monofunctional

5. An alloy according to claim 1, containing from about 0.1 to 5% by weight of the compatibilizing agent.

6. An alloy of claim 1 wherein the compatibilizing copolymer comprises a copolymer of the formula

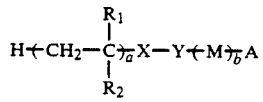

wherein
R₁ is hydrogen or methyl,
R₂ is

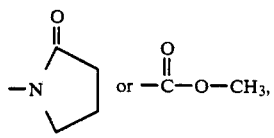

M is a monomeric unit derived from a member selected from the group consisting of ethylenically unsaturated monomers and polycondensable monomers, a and b independently are numbers between about 2 and 1000, A is selected from the group consisting of:
(1) wherein A is

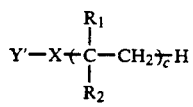

wherein
c is a number between about 2 and 1000, with the proviso that Y and Y' represent the functional residue of a limitator of a di-functional chain if M is derived from a polycondensable monomer or Y and Y' represent the functional residue of a di-functional polymerization agent if M is derived from an ethylenically unsaturated monomer,
—X— is a member selected from the group consisting of:

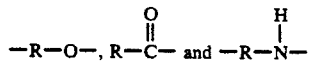

wherein the X and Y groups or X and Y' groups, or X and (M)ᵦ are interbonded by an ester or amide function, R being the residue of a monofunctional transfer agent;

(2) wherein A is the non-functional residue of a monofunctional polymerization agent if M is derived from an ethylenically unsaturated monomer, with the proviso that Y is the residue of the functional portion of the a monofunctional agent, the function of which is a member selected from the group consisting of:

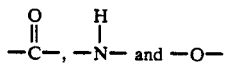

—X— is a member selected from the group consisting of:

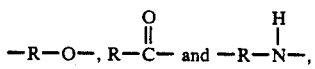

wherein the X and Y groups are interbonded by an ester or amide function and R is the residue of a monofunctional transfer agent and, (3) when M is derived from a polycondensable monomer A is the residue of a monofunctional chain limitator, the proton of which is excluded if the active function is an amine or an alcohol, or the hydroxyl group is excluded if the active function is a carboxylic acid, with the proviso that Y is O and, —X— is a member selected from the group consisting of:

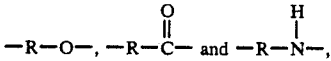

wherein the X and (M)ᵦ groups are interbonded by an ester or amide function, and R is the residue of a monofunctional transfer agent.

7. The alloy of claim 6, wherein a and b independently are numbers between about 10 and 50.

8. The alloy of claim 6, wherein C is a number between about 10 and 50.

9. An alloy of claim 6 wherein the monofunctional telomer is of the formula:

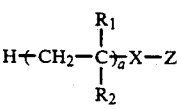

wherein R₁, R₂, a and X are as defined above and Z=hydrogen when —X— is —R—O—

or Z=OH when —X— is

10. An alloy of claim 6 wherein the ethylenically unsaturated monomer is a compound of the formula:

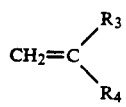

wherein

R$_3$ is hydrogen or a methyl group

R$_4$ is an aromatic ring containing 6 carbon atoms or a linear or branched aliphatic hydrocarbon group containing from 1 to 10 carbon atoms.

11. An alloy of claim 6 wherein the poly-condensable monomer is a compound of the formula:

$$B—R_5—D$$

wherein

R$_5$ is a linear or branched alkyl chain containing from 4 to 12 carbon atoms or an aromatic nucleus B is an NH$_2$, OH, COCl or COOQ group wherein Q=H, or a linear or branched alkyl chain containing from 1 to 4 carbon atoms D is an NH$_2$, OH, COCl or COOQ group wherein Q=H, or a linear or branched alkyl chain containing from 1 to 4 carbon atoms.

12. An alloy of claim 6 wherein the copolymer is formed by condensation of the telomer and the oligomer, made malleable by heat, in substantially stoichiometric quantities of functional groups to ensure the condensation.

13. An alloy of claim 6 wherein the monofunctional oligomer is of the formula:

$$T—Y—(M)_b—A$$

wherein b is a number between about 2 and 1000 and wherein when M is a monomeric unit derived from an ethylenically unsaturated monomer, then:

A is the non-functional residue of a monofunctional polymerization agent;

Y is the residue of the functional portion of the monofunctional polymerization agent, the function of which is a member selected from the group consisting of:

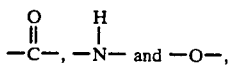 and —O—,

—X is a member selected from the group consisting of:

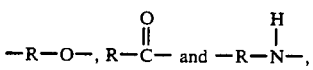

wherein the X and Y groups are interbonded by an ester or amide function and R is the residue of a monofunctional transfer agent;

T=H when Y is a

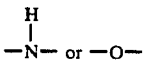

or T=OH when Y is a

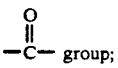 group;

or when M is a monomeric unit derived from a polycondensable monomer comprising the residue of a monofunctional chain limitator, the proton of which is excluded if the active function is an amine or an alcohol, or the hydroxyl group is excluded if the active function is a carboxylic acid, then:

Y is zero;

—X — is a member selected from the group consisting of —R—O,

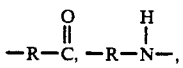

wherein the X and (M)$_b$ groups are interbonded by an ester or amide function, and R is the residue of a monofunctional transfer agent;

T=H if the active function of A is an amine or an alcohol, or T=OH if the active function of A is a carboxylic acid, and b is as defined.

14. An alloy of claim 6 wherein the di-functional oligomer corresponds to the formula:

$$T—Y(M)_b—Y'—T'$$

wherein b is as defined, Y and Y' are as defined under (1) and when M is a monomeric unit derived from a polycondensable monomer or from a lactam and the chain limitator is a diacid, then T=H or OH and respectively, T'=OH or H, when the chain limitator is a diol, or a diamine, or an aminoalcohol, then $$T=T'=H$$

or wherein M is a monomeric unit derived from an ethylenically unsaturated monomer:

T=T'=OH when the difunctional polymerization agent is a diacid or T=T'=H, the difunctional polymerization agent is a diamine or a diol.

15. An alloy of claim 1 wherein the incompatible thermoplastic polymers comprise mixtures of at least two polymers selected from the group consisting of polyamide-fluorinated polymers; polyethylene-fluorinated polymers, polyetheramide block copolymer-polyvinylchloride, polystyrene-poly vinylchloride, polyethylene-polyvinyl chloride and ethylene-vinylacetate copolymer-polyvinylchloride.

16. An alloy of claim 6 wherein the incompatible thermoplastic polymers comprise mixtures of at least tow polymers selected from the group consisting of polyamide-fluorinated polymer; polyethylene-fluorinated polymers, polyetheramide block copolymer-polyvinylchloride, polystyrene-poly vinylchloride, polyethylene-polyvinyl chloride and ethylene-vinylacetate copolymer-polyvinylchloride.

17. An alloy of claim 1 wherein the incompatible thermoplastic polymers comprise mixtures of at least two polymers selected from the group consisting of polyamide 11 - polyvinylidene fluoride, polyamide 12-polyvinylidene fluoride, polyetheramide block copolymer-polyvinylidene fluoride, polyethylene-polyvinylidene fluoride, and polyetheramide block copolymer-polyvinylchloride.

18. An alloy of claim 6 wherein the incompatible thermoplastic polymers comprise mixtures of at least two polymers selected from the group consisting of polyamide 11 - polyvinylidene fluoride, polyamide 12-polyvinylidene fluoride, polyetheramide block copolymer-polyvinylidene fluoride, polyethylene-polyvinylidene fluoride, and polyetheramide block copolymer-polyvinylchloride.

19. An alloy of claim 6, containing from about 0.1 to 5% by weight of the compatibilizing copolymer.

* * * * *